United States Patent [19]

Ishihara

[11] Patent Number: 4,702,158

[45] Date of Patent: Oct. 27, 1987

[54] POPCORN POPPER HAVING IMPROVED HEATED AIR FLOW

[76] Inventor: Naoki Ishihara, Flat 209, Viking Villa, 70 Tin Tau Temple Rd., Hong Kong, Hong Kong

[21] Appl. No.: 829,771

[22] Filed: Feb. 14, 1986

[51] Int. Cl.[4] .......................... A23L 1/18; F26B 3/08
[52] U.S. Cl. .................. 99/323.5; 99/323.8; 34/10; 34/57 A; 34/233; 219/400
[58] Field of Search ................ 99/323.5, 323.6, 323.8, 99/323.9, 323.11, 323.7, 483, 485; 34/10, 57 A, 48, 55, 233; 219/400; 426/445

[56] References Cited

U.S. PATENT DOCUMENTS

| | | | |
|---|---|---|---|
| 3,323,440 | 6/1967 | Grant | 99/323.5 |
| 3,665,839 | 5/1972 | Gottlieb | 99/323.5 |
| 3,756,139 | 9/1973 | Wolens | 99/323.5 |
| 4,152,974 | 5/1979 | Tienor | 99/323.8 |
| 4,178,843 | 12/1979 | Crabtree | 99/323.8 |
| 4,494,314 | 1/1985 | Gell | 99/323.9 |

Primary Examiner—Robert W. Jenkins
Attorney, Agent, or Firm—Moonray Kojima

[57] ABSTRACT

A popcorn popper of the heated air flow type wherein the popping chamber is shaped to have a plurality of radially arranged holes along a bottom periphery with the lower wall portion being of gradually smaller diameter and the bottom having a raised portion and wherein by a diffusing device which directs the heated air inward from the outer periphery and upward through the holes in the bottom of the chamber, a more even and efficient heating is attained.

10 Claims, 5 Drawing Figures

POPCORN POPPER HAVING IMPROVED HEATED AIR FLOW

BACKGROUND OF THE INVENTION

1. Field of Invention.

This invention relates to popcorn poppers and more particularly to such popcorn poppers utilizing heat air flow to pop the corn.

2. Discussion of Prior Art.

Popcorn poppers using heat air flow are well known. Different air flow patterns are used, but, each has its own set of problems. The factors which are desired in a popcorn popper of the air flow type are, for example, small size, power efficiency, small number of parts, simplicity of design, inexpensive to manufacture, and good and efficient heat distribution. The competitive pressures have brought the price of heated air flow poppers down by a factor of 3 to 1, since the poppers first appeared. Thus, costs and efficiency are important.

SUMMARY OF THE INVENTION

Accordingly, an object of the invention is to overcome the aforementioned and other deficiencies of the prior art.

Another object is to provide a heated air flow type popcorn popper wherein a paddle wheel type fan applies air upward to expose the air to a heater coil for heating to a suitable temperature and then applies the heated air through a diffuser having a plurality of radially directed fins for dividing and directing the heated air upward through holes in the bottom of the popping chamber.

DETAILED DESCRIPTION OF PREFERRED EMBODIMENT.

Figure 1:
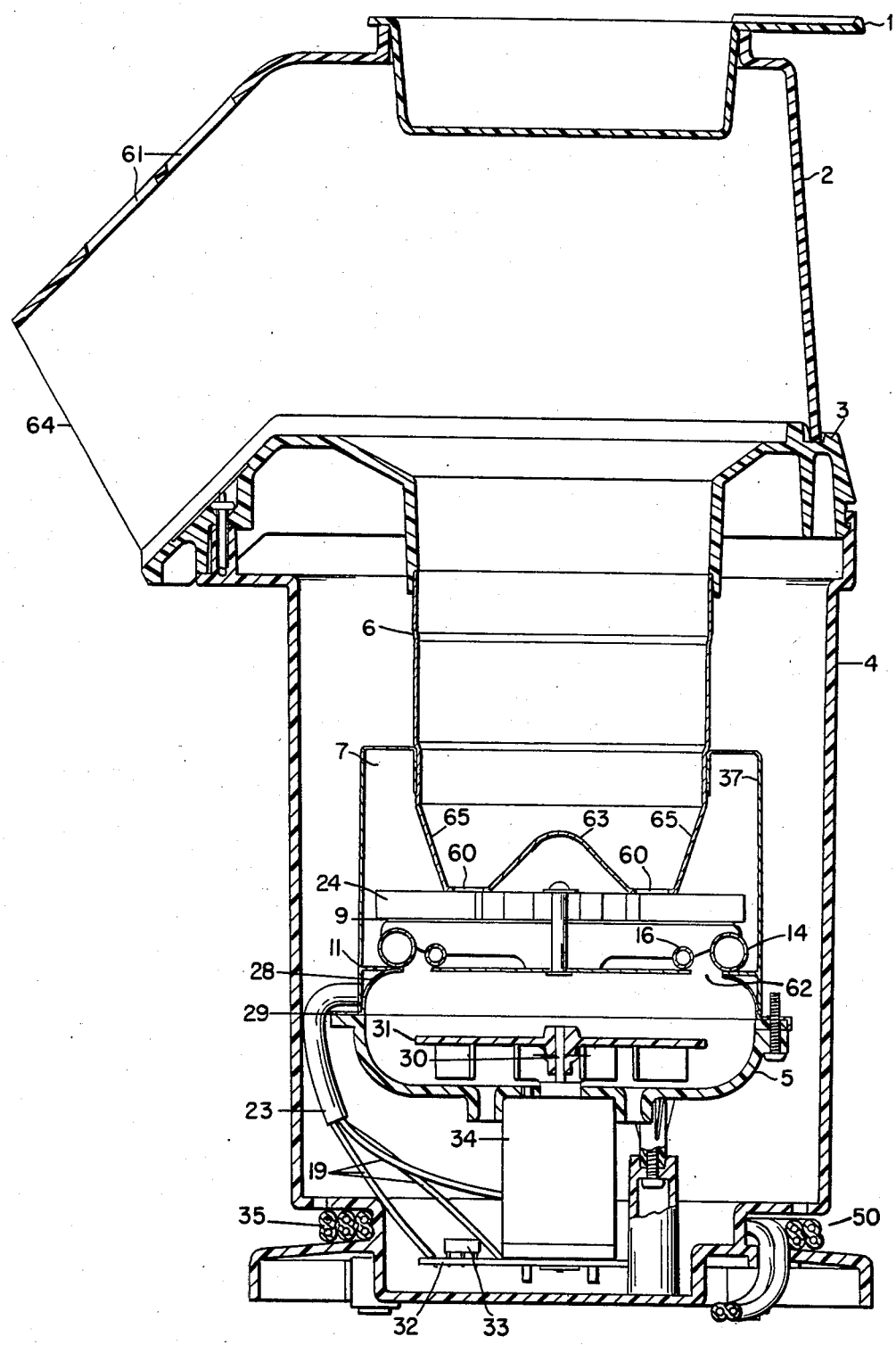
FIG. 1 is a cross sectional elevational view depicting an illustrative embodiment of the invention.
Figure 2:
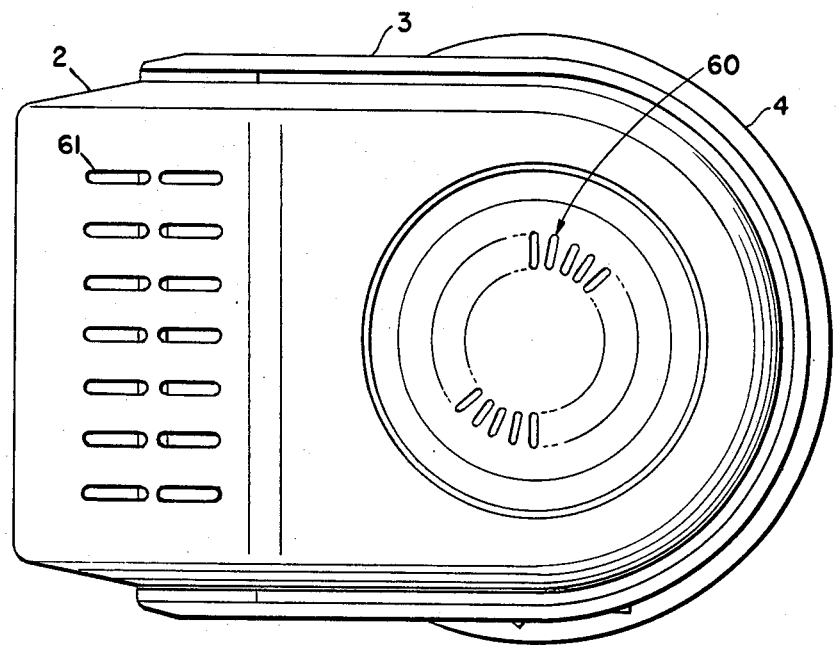
FIG. 2 is a top view depicting the FIG. 1 embodiment.
Figure 3:
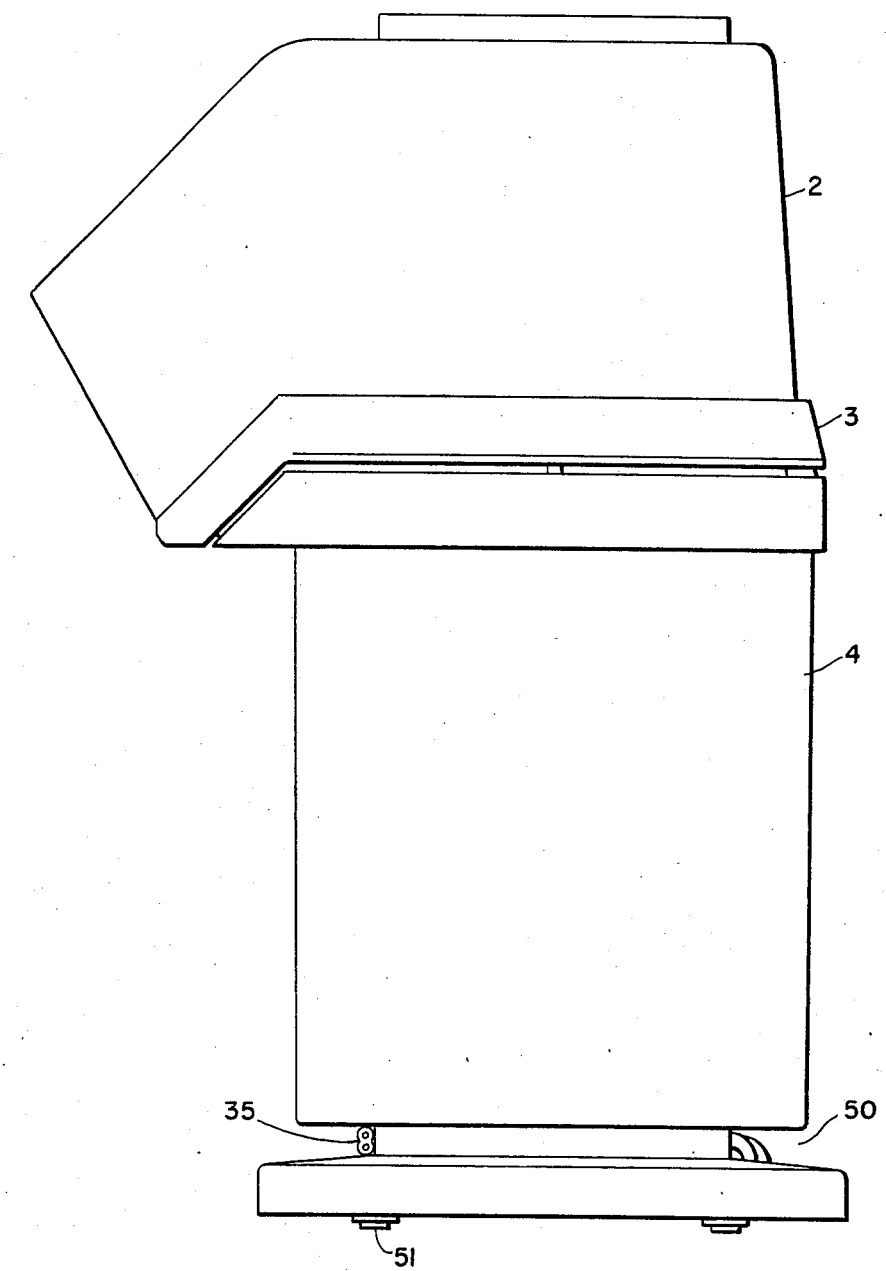
FIG. 3 is an elevational outside view depicting the FIG. 1 embodiment and showing the outer housing.

Taking FIGS. 1, 2, 3 together, the illustrative embodiment comprises an outer housing 4 of circular cylindrical shape and of plastic material, a removable chute 3 of plastic material, a removable chute cover 2 of plastic material, and a removable butter holding cup 1 of plastic material.

To insert the unpopped corn for popping, the chute cover 2, and chute 3, are placed on top of housing 4 and cup 1 is removed from cover 2. This provides an opening directly to popping chamber 6. After the corn is popped, it will rise and be forced by the rising air to flow out of mouth 64. Ventilation holes 61 are provided in the mouth portion of chute cover 2 as depicted in FIGS. 1 and 2. Excess heat and air are exited through these holes. As can be seen more clearly in FIG. 2, when cup 1 is removed, access is provided into chamber 6.

Returning to FIGS. 1, 3, the bottom part of outer housing 4 has a circumferential channel 50 in which power cord 35 maybe wound for storage. In this manner, advantageously, a compact unit for storage is attained. At the bottom of the housing 4 are provided a plurality of legs or pads 51 disposed at 90° from each other along the periphery of the bottom of housing 4. At least two of these pads which are adjacent to each other, are of rubber of similar flexible material. Advantageously, such pads effectively prevent slippage of the unit from the surface of the table top or like.

Suitably disposed, such as by screws, within the outer housing 4 are the popping chamber 6, which is of metal, motor 34, fan 31, which is on motor shaft 30, heater element 14, diffuser 24 and air chamber 7. The motor 34 is powered via internal wires 19, which are insulated by a fiber glass shield 23, and winding 16, with use of bridge rectifier 33. The fan 31 is held within a fan housing 5 which is connected to air flow deflector 28 with a seal ring 29 therebetween. Disposed above these is an insulator air directing plate 11 which has a plurality of circumferentially disposed openings 62 located near heater element 14 so that air can be directed by fan 31 through hole 62 and into contact with heater 14 to heat the air and then have the heated air go into air chamber 7 along the walls of chamber 6. The heater element 14 and motor winding 16 are held on coil support 10. Between diffuser 24 and coil support 10 is an insulator disk 9.

Located toward the lower part of chamber 6 is an air chamber 7 formed of circular dylindrical shape and of metal, and of larger diameter than chamber 6. The top of chamber 7 is connected to chamber 6 and the bottom of chamber 7 is connected to fan housing 5. Inside the walls of chamber 7 is provided a sheet of insulating material 37 to shield the outside housing from the heat within chamber 7. In this manner, the heated air does not heat the outer housing 4, which is thus, cool to the human touch.

The popping chamber 6 has a lower wall portion 65 which slopes inwardly until it reaches the bottom. That is, the diameter of the lower portion becomes smaller gradually until the bottom. At the bottom of chamber 6, are a plurality of holes 60 shaped to be radially directed, as depicted more clearly in FIG. 2. A raised semispherical portion 63 is at the center of the bottom of chamber 6. Located below the bottom of chamber 6 and accessible to holes 60 is the diffuser 24.

Figure 4A:
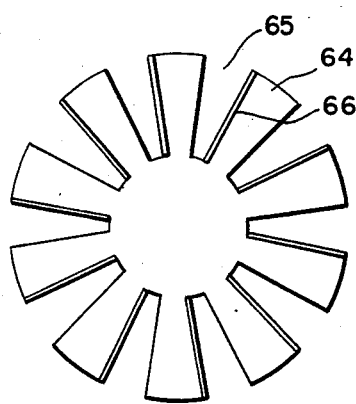
FIG. 4A is a plan view depicting the diffuser of the invention.
Figure 4B:
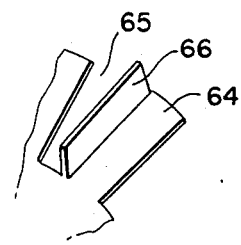
FIG. 4B is a perspective view of one fin of the diffuser of FIG. 4A.

As seen more clearly in FIGS. 4A, 4B, the diffuser is a circular flat metallic plate which is cut as shown and bent to provide the fins. That is, the part which is cut from the plate is raised at 90° angle to the remaining plate surface 64 to form fin 66, leaving an opening 65. The fins 66 are radially directed, such as spokes in a bicycle wheel.

This diffuser operates to divide the heated air flow, and then direct the divided heatedaair upward through the holes 60 and into chamber 6. In other words, motor 34 operates fan 31, to force air upward through plate holes 62, to contact heater element 14, and then after heating the air goes upward along the walls of chamber 7, and, through built up pressure, into contact with fins 66 of diffuser 24. The diffuser 24 then breaks up the heated air, and directs the heated air inward to the axis and upward through holes 60 into the bottom part of chamber 6, whereat due to the heated air, the corn is popped. Then, the popped corn moves upward and out of chamber 6 through mouth 64 of chute cover 2.

Advantageously, the diffuser enables more effective and even efficient distribution of heat, and the entire apparatus is simpler than the prior art, and requires fewer parts and is inexpensive to produce. Also, the diffuer enables more efficient use of the heated air by breaking up the air and directing the heated air upward through the inwardly shaped holes at the bottom of the popping chamber.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A popcorn popper using heated air flow to produce popping of the corn, comprising
   a circular cylindrical popping chamber having a bottom surface and an open top, said bottom surface having a plurality of openings;
   a motor;
   a fan connected to and driven by said motor;
   a heating element disposed above said fan;
   means for directing air blown by said fan to contact and be heated by said heating element, and then for directing the heated air outward radially and upwardly; and
   diffusing means disposed between said bottom surface and said means for directing, and comprising a plurality of radially extending fins, said diffusing means dividing and directing said heated air inward radially and upward and substantially evenly through said openings in said bottom surface of said popping chamber.

2. The popper of claim 1, wherein said means for directing comprises a chamber enclosing said fan, said heater element, and said diffusing means.

3. The popper of claim 1, wherein said means for directing comprises a first means for holding said heating element, and a second means having openings for directing air into contact with said heating element.

4. The popper of claim 1, wherein said means for directing comprises an air chamber comprising a bottom section and a top section, said top section being of cylindrical shape with a diameter larger than said popping chamber and surroundig a lower part of said popping chamber.

5. The popper of claim 1, wherein said diffusing means comprises a thin plate having a plurality of radial section bent upward to form said fins.

6. The popper of claim 1, wherein said plurality of openings in said bottom surface are shaped to be directed extending radially, and said bottom surface has a semi-spherical raised part at the center thereof, and a bottom part of said wall of said popping chamber decreases gradually in diameter toward said bottom surface.

7. A popcorn popper using heated air flow to produce popping of the corn, comprising
   a circular cylindrical popping chamber having a bottom surface and an open top, said bottom surface having a plurality of openings;
   a motor;
   a fan connected to and driven by said motor;
   a heating element disposed above said fan;
   means for directing air blown by said fan to contact and be heated by said heating element, and then for directing the heated air outward radially, and upwardly;
   diffusing means disposed between said bottom surface and said means for directing, and comprising a plurality of radially extending fins, said diffusing means dividing and directing said heated air inward radially and upward and substantially evenly through said opening in said bottom surface of said popping chamber;
   an outer housing containing said popper chamber, motor, fan, heating element, means for directing and said diffusing means, said outer housing being of circular cylindrical shape and of plastic material, and having an upper portion and lower portion, said lower portion having a circumferential channel for holding a power cord for storage;
   a chute removably disposed on said upper part of said outer housing;
   a chute cover removably disposed on said chute and having a mouth for exiting of popped corn; and
   a butter holding cup removably disposed to be directly above said popping chamber.

8. The popper of claim 7, wherein said bottom portion of said outer housing has attached to the bottom surface thereof a plurality of pads, at least two adjacent pads being of rubber.

9. The popper of claim 7, wherein said holes in said bottom surface of said popping chamber are shaped to be radially extending, and said bottom part of said popping chamber gradually decreases diameter toward said bottom surfcce.

10. The popper of claim 9, wherein said bottom surface has a semi-spherical raised portion at the center thereof.

* * * * *